United States Patent Office 2,876,090
Patented Mar. 3, 1959

2,876,090

PROMOTION OF FLOWERING ON PINEAPPLE PLANTS

Robert W. Leeper, Honolulu, Territory of Hawaii, and Victor C. Fusco, New Kensington, Pa., assignors to Olin Mathieson Chemical Corporation, a corporation of Virginia No Drawing. Application October 9, 1957
Serial No. 689,053

5 Claims. (Cl. 71—2.7)

This invention relates to a new composition of matter, the process of its production and the process of promoting flowering in vegetative pineapple plant by applying such composition to the plants. More specifically, this invention relates to beta-hydroxyethyl-N-beta-hydroxyethyl-carbazinate having the formula

HOCH$_2$CH$_2$NHNHCOOCH$_2$CH$_2$OH

It has now been found that beta-hydroxyethyl-N-beta-hydroxyethylcarbazinate can be prepared by the exothermic reaction of beta-hydroxyethylhydrazine with ethylene carbonate with stirring and cooling according to the following equation:

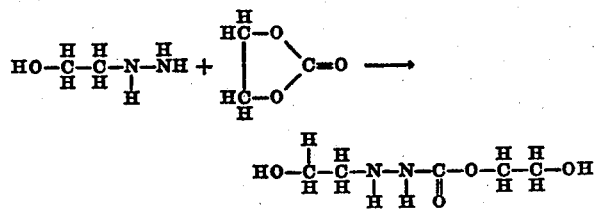

Example 1

A slurry of 167 grams (1.90 moles) of ethylene carbonate in 150 grams of distilled water was stirred and cooled to 5° C., while adding a solution of 144 grams (1.90 moles) of beta-hydroxyethylhydrazine mixed with 100 grams of distilled water. The addition required about 30 minutes and the mixture was held at 3° C. to 7° C. for an additional two hours and then allowed to warm to room temperature overnight. Water was removed by distillation at 70–80 millimeters pressure to obtain the product in the form of a viscous yellow oil. The yield of beta-hydroxyethyl-N-beta-hydroxyethyl carbazinate was 94.5 percent. The analyses of the yellow oil were as follows:

| C$_5$H$_{12}$O$_4$N$_2$ | Wt. Percent C | Wt. Percent H | Wt. Percent N |
|---|---|---|---|
| Calculated | 36.59 | 7.32 | 17.07 |
| Found | 36.45 | 7.31 | 17.11 |

Control of flowering in pineapple is particularly important compared to other crops, because of the hand labor and machinery required for harvesting. If a complete harvest can be made in a second trip at a later date, labor costs, time and equipment costs are reduced. For this reason, it is important to control the flowering and fruiting by having available chemicals for treatment which will prevent flowering until the vegetative plants are of adequate size and then apply a compound which will accelerate the flowering and resulting fruiting of the plants. It is a further advantage of such treatment that the second crop borne on the mother plant will also appear more uniformly permitting a complete harvest. Subsequent fertilization and other field management operations are more efficient.

It has also been found that, when vegetative pineapple plants are treated with beta-hydroxyethyl-N-beta hydroxyethyl-carbazinate, their flowering is appreciably promoted. The compound can be applied to the plants in any of several ways known to the art. It may be applied directly by dusting, but, preferably, is first diluted with clays or other powders, e. g., pyrophyllite, diatomaceous earth, attapulgite. A wettable powder composition can be prepared by including wetting and suspending agents, for example anionics including alkylbenzene sulfonates (sodium dodecylbenzene sulfonate) or non-ionics including polyoxyalkylated tall oil or polyoxyethylated alkylphenol. Santomerse D is a proprietary alkylbenzene sulfonate and Atlas G1225 is a polyoxyethylated tall oil. The wettable powder is suitably diluted with water before application to the plants. Such aqueous compositions are usually applied to the plants by spraying.

The beta-hydroxyethyl-N-beta-hydroxyethyl-carbazinate is thus applied to the plants at an average rate of from about 50 to 500 milligrams per plant, preferably about 50 to 150 milligrams per plant.

Example II

Two groups of vegetable pineapple plants were sprayed with aqueous solutions of beta-hydroxyethyl-N-beta hydroxyethyl-carbazinate in a manner such that, in the first group, 60 mg. of the compound were applied per plant and, in the second group, 120 mg. of the compound were applied per plant on October 10. On the following January 10, it was found that flowering occurred in 20 percent of the plants of the first group, 70 percent of the second group and in none of the plants in untreated control groups.

What is claimed is:

1. Beta-hydroxyethyl-N-beta-hydroxyethyl-carbazinate.
2. The method of producing beta-hydroxyethyl-N-beta-hydroxyethyl-carbazinate which comprises admixing beta-hydroxyethylhydrazine, ethylene carbonate and water with cooling, warming the mixture to room temperature, and removing the water to recover beta-hydroxyethyl-N-beta-hydroxyethyl-carbazinate.
3. In the promotion of the flowering of vegetative pineapple plants, the step of applying beta-hydroxyethyl-N-beta-hydroxyethyl-carbazinate.
4. The method of claim 3 in which the amount of beta-hydroxyethyl-N-beta-hydroxyethyl-carbazinate is from 5 to 500 mg. per plant.
5. The method of claim 3 in which the amount of beta-hydroxyethyl-N-beta-hydroxyethyl-carbazinate is from 50 to 150 mg. per plant.

No references cited.